(12) United States Patent
Osborne et al.

(10) Patent No.: US 6,425,426 B1
(45) Date of Patent: Jul. 30, 2002

(54) PNEUMATIC TIRE WITH CORDS DIRECTLY CONTACTING TREAD COMPOUND

(75) Inventors: Daniel G. Osborne, Greer; James R. Anderson, Simpsonville, both of SC (US)

(73) Assignee: Michelin Recherche et Technique S.A. (CH)

(*) Notice: Subject to any disclaimer, the term of this patent is extended or adjusted under 35 U.S.C. 154(b) by 47 days.

(21) Appl. No.: 09/731,450

(22) Filed: Dec. 7, 2000

Related U.S. Application Data

(63) Continuation-in-part of application No. PCT/US99/28994, filed on Dec. 7, 1999.

(51) Int. Cl.[7] .......................... B60C 11/00; B60C 9/18; B60C 9/20; B60C 9/22
(52) U.S. Cl. ................. 152/209.5; 152/209.1; 152/526; 152/527; 152/531; 152/532; 152/533; 152/537; 156/117; 156/130
(58) Field of Search .................. 152/527, 531, 152/533, 537, 532, 209.5, 526, 209.1; 156/117, 130

(56) References Cited

U.S. PATENT DOCUMENTS

| | | |
|---|---|---|
| 4,216,813 A | 8/1980 | Kersker et al. |
| 4,293,019 A | 10/1981 | Maiocchi |
| 5,134,024 A * | 7/1992 | Carrier ................ 152/533 X |
| 5,385,188 A | 1/1995 | Kogure et al. |
| 6,199,612 B1 | 3/2001 | Pereira |

FOREIGN PATENT DOCUMENTS

| | | |
|---|---|---|
| EP | 0 661 179 A1 | 7/1995 |
| EP | 0 990 539 A2 | 4/2000 |
| FR | 2 429 678 | 1/1980 |
| GB | 2 033 852 A1 | 5/1980 |

OTHER PUBLICATIONS

Patent Abstracts of Japan No. 6–32111, Published Feb. 8, 1994, Bridgestone Corp.

Patent Abstracts of Japan No. 6–71781, Published Mar. 15, 1994, Bridgestone Corp.

* cited by examiner

*Primary Examiner*—Adrienne C. Johnstone
(74) *Attorney, Agent, or Firm*—Martin Farrell; Alan A. Csontos; Felipe Farley

(57) ABSTRACT

The invention relates to a pneumatic tire wherein the crown has a ply comprised of substantially circumferentially oriented cords which are spirally wound. The winding pitch p of said cords is greater than 2.5 times the cord diameter Φ. The tread compound is applied directly on said cords. This arrangement facilitates tire fabrication and assures good adherence between the tread compound and the rest of the crown of the tire.

12 Claims, 4 Drawing Sheets

PNEUMATIC TIRE WITH CORDS DIRECTLY CONTACTING TREAD COMPOUND

This application is a continuation-in-part of application PCT/US99/28994, filed Dec. 9, 1999.

BACKGROUND OF THE INVENTION

The invention relates to a pneumatic tire for vehicles, in particular a tire the architecture of which is optimized to facilitate fabrication while retaining high reliability and endurance.

It is common practice in the art, particularly for tires for passenger cars which must be capable of rolling at high speeds, to use a tire ply comprised of substantially circumferentially oriented cords for the purpose of reinforcing the stiffening hoop effect of the tire crown. This ply may be disposed radially outwardly of the other reinforcing plies customarily used in the crown. Such a tire ply is generally called a <<zero-degree ply>>.

For use in typical passenger cars, the cords in the ply are generally based on Nylon. Because Nylon cord has a relatively low modulus of elasticity, it is usually laid at a high laying density, that is to say with a winding pitch the magnitude of which is close to the diameter of the cord itself.

In such classical configurations, the gap left between two adjacent cords, called the <<inter-cord space, i>>, is small, often less than 0.4 Φ, where Φ is the diameter of the cord. Most often, $$i<0.25\Phi.$$

Thus, for a cord of diameter 0.7 mm, the inter-cord space is typically on the order of 0.175 mm.

Accordingly, in order to obtain good bonding of the zero degree ply within the crown of the tire, it is necessary to apply around its cords an optimized layer of decoupling compound. This layer of decoupling compound must present high adherence to the cords and high strength, to enable said layer to resist shear stresses between adjacent cords. The composition of this layer of decoupling compound must also be such as to enable good adherence with the tread compounds, which latter are disposed radially outward of this layer of decoupling compound.

It has been found that it is difficult to achieve good adherence of the tread compounds with the zero degree ply comprised of substantially circumferentially oriented cords.

Definitions

In the following, <<cord>> is understood to mean both monofilaments and multifilaments, or assemblies such as cables, plied yarns or any other type of equivalent assemblies, and this, regardless of the material or treatment of these cords, for example, surface treatment or coating or dipping to promote adhesion to the rubber.

<<Compound>> means a rubber mix having one or more base elastomer and additives selected in accordance with the properties of the compound desired for the zone of the tire it is used.

<<Layer of decoupling compound>> for a given reinforcing ply is understood to mean the rubber compound in contact with the reinforcing cords of the ply, adhering to these and filling the gaps between adjacent cords.

<<Contact>> between a cord and a layer of decoupling compound is understood to mean that at least part of the outer circumference of the cord is in intimate contact with the rubber compound constituting the decoupling compound.

<<Linear density>> applied to a cord is the weight in grams per 1000 meters of the cord, stated in units of <<tex>>. The units used for the stress on a cord, or the modulus of elasticity of a cord are centi-newton per tex (cN/tex).

<<Winding pitch, p>>, applied to a substantially circumferentially oriented cord which is spirally wound particularly in a large-diameter spiral having as its main axis the main axis of the tire, is the transverse distance between the cord axes of the cords of two adjacent loops in the spiral. <<Laying density, d>>, is the reciprocal of the winding pitch and thus corresponds to the number of loops of a spirally wound cord per unit axial length (along the main axis of the winding). Customarily, d is stated as the number of cords per decimeter (units of 1/dm), and p is stated in units of millimeters.

Thus p=100/d.

The fill density of reinforcing cords in a ply is characterized by the <<fill coefficient, FC>>, defined as the ratio of the diameter of the cord to the laying distance:

$$FC=\Phi/p,$$

where

Φ is the diameter of the cord; and p is the winding pitch of the cord.

Typically, this ratio is >0.6, and often it is >0.75.

BRIEF SUMMARY OF THE INVENTION

The principal claimed matter of the invention relates to a tire, comprising a crown extended by two respective sidewalls and two respective beads, and a carcass which is anchored in said beads, said crown having the following components, disposed in the following order with progression radially from the interior to the exterior with respect to the main axis of the tire:

at least one reinforcing ply comprised of parallel cords disposed at an angle α in the range 10–75° with respect to the circumferential direction;

at least one radially outermost ply having an axial width comprised of cords which are spirally wound wherewith the cords themselves are substantially oriented in the circumferential direction, said circumferentially oriented cords having a radially outward side of the cords and a radially inner side of the cords, and a tread compound;

wherein, in a substantial portion of the axial width of said at least one radially outermost ply, in any cross section perpendicular to the axis of the tire and intersecting a cord of said at least one radially outermost ply:

said tread compound has direct contact with the radially outward side of the cords of said at least one radially outermost ply, there is a first decoupling layer comprising a decoupling compound different than the tread compound, said decoupling compound having direct contact with the radially inner side of the cords of said at least one radially outermost ply, the tread compound having contact with the decoupling compound in interfaces terminating axially on the cords of said at least one radially outermost ply; and the one radially outermost ply has a fill coefficient FC ≦0.4, said fill coefficient being defined as $$FC=\Phi/p,$$

where Φ is the cord diameter of said cords and p is the winding pitch between the cord axes of neighboring said cords comprising the spiral winding.

It follows that the inter-cord space must be at least 1.5Φ; thus for a cord of diameter 0.7 mm the inter-cord space must be at least 1.05 mm.

The direct application of the tread compound on the substantially circumferentially oriented cords facilitates the tire fabrication by limiting the number of components to be assembled. The wide winding pitch of these cords ensures excellent reliability and endurance of the adhesion between the tread and the rest of the crown, in that said adhesion is attributable principally to direct bonding between rubber compounds which are in mutual contact.

As substantial portion of the axial width of the radially outermost ply is meant at least 5% of this axial width.

Preferably, the fill coefficient of the radially outermost ply comprised of substantially circumferentially oriented cords is <0.4 over the entire width of the radially outermost ply.

According to an advantageous variant embodiment, the fill coefficient of said radially outermost ply is lower in the central zone of the crown than in the lateral zones; thus the winding pitch of said circumferentially oriented cords is greater in the central zone of the crown. This enables a higher density of reinforcing components in the lateral regions (shoulder regions), which increases the resistance of the tire to high speed conditions.

According to a second variant embodiment, the fill coefficient of the radially outermost ply comprised of substantially circumferentially oriented cords is higher in the central zone of the crown than in the lateral zones; thus the density of reinforcing components is higher in said central region, which enables a flatter transverse profile of the tire, thereby improving tire performance in vehicle handling.

According to an other embodiment, the tread comprises two compounds, a first tread compound intended to come into contact with the road and an underlayer compound, different from the first tread compound, disposed radially inwardly of said first tread compound. In this embodiment, the underlayer compound is in direct contact with the said substantially circumferentially oriented cords of the radially outermost ply.

Such underlayers are known in the art. Compositions of such underlayers are intended to improve various aspects of performance, such as tire wear or the cornering stiffness of the tire. However, the optimization tends to come at the cost of inferior adherence to a cord structure and/or lower strength parameters, when compared to classical tread compositions applied by calendering.

Thus the invention offers the possibility of products with improved performance.

The substantially circumferentially oriented cords which are spirally wound develop a stress at 3% deformation greater than 12 cN/tex, and preferably than 20 cN/tex. Thus they offer a high modulus of elasticity at appreciable deformations, thereby allowing the ply of which they are comprised to perform its functions well, and in particular the conferring of strength to the crown during operation at high speed.

The said circumferentially oriented cords may also have an initial modulus of elasticity less than 900 cN/tex, and preferably less than 800 cN/tex. The advantage of the low initial modulus is a more comfortable ride and lower tire coast-by noise, during operation at low speed.

Such a cord may be a hybrid cord or yam comprised of at least one Nylon cord or yarn and at least one aramid cord or yam.

BRIEF DESCRIPTION OF THE DRAWINGS

Various embodiments of the invention will be described hereinbelow, with reference to the accompanying drawings, in which.

DETAILED DESCRIPTION OF THE INVENTION

Figure 1:
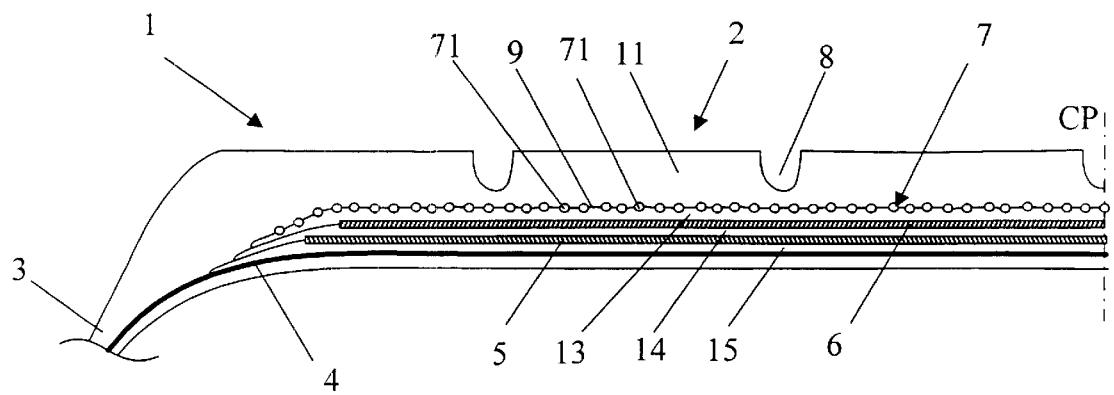
FIG. 1 is a partial transverse cross section of a pneumatic tire 1 according to the invention.

FIG. 1 is a partial transverse cross section of a pneumatic tire 1 according to the invention. CP indicates the mid circumferential center plane perpendicular to the axis of the tire. This tire is comprised of a crown 2 extending to two sidewalls 3, which sidewalls have two respective beads (not shown). The crown has:

a carcass ply 4, which is anchored in known fashion in the two beads;

two reinforcing belts 5, 6 each of which is formed from parallel cords and is disposed at a bias angle (α, β respectively, in particular on the order of +30° and −30° respectively) with respect to the circumferential rolling direction, wherewith the cords of ply 5 are at an appreciable crossing angle to those of ply 6;

an outer ply 7 comprised of textile cords which are substantially circumferentially oriented;

a tread compound 11;

a first decoupling layer 13 between the outer ply 7 and the reinforcing belt 6;

a second decoupling layer 14 between the two reinforcing belts 5 and 6; and a third decoupling layer 15 between the carcass 4 and the reinforcing belt 5.

The carcass ply 4 is substantially oriented radially, i.e. at 90° to the circumferential direction. The tread surface of the crown 2 has grooves 8.

The tread compound 11 is in direct contact with the radially outward side of the textile cords 71 of the radially outermost ply 7. The first decoupling layer 13 is made of a decoupling compound. The decoupling compound is in direct contact with the radially inner side of the cords 71 of the radially outermost ply 7. The tread compound also comes in contact with the decoupling compound of the first decoupling layer 13 in interfaces 9 located between the textile cords 71. For instance, as shown in FIG. 1, the interfaces 9 appearing axially between two adjacent textile cords 71 are substantially even with the center of said textile cords 71 of the radially outermost ply 7. This particular radial position of the interfaces could be substantially different, i.e. radially slightly above the outermost face of the textile cords 71 or radially slightly inwardly of the innermost face of said textile cords 71.

Advantageously, the tread compound is laid down by a strip winding technique: strips 16 (see FIG. 3) are wound continuously on said radially outermost ply 7, as opposed to the use of a profiled semi-finished tread wound in one turn. Then the desired profile is imposed by the profile 18 of a mold during the vulcanization step. During the vulcanization step, all the voids which could possibly be left by the use of a strip winding technique, as shown schematically on FIG.

6 between the radially inward portion of the strips 16 and said radially outermost ply 7 and said decoupling layer 13 shall disappear.

Also, it is advantageous to lay said radially outermost ply 7 down by winding a single cord 71 along the desired path, as opposed to the common technique of laying down a strip including a plurality of cords (e.g. 10 cords) embedded in parallel into calendering rubber, as shown for instance in U.S. Pat. No. 4,869,307. "Winding a single cord" means guiding individually one single cord to arrange the cord along the predefined path into the radially outermost reinforcing layer 71, and does not exclude that more than one cord is used to build up said radially outermost reinforcing layer, being intended that every cord is so individually guided when laid down. For instance, one individual cord 71 can be wound for the left portion of said radially outermost ply 7, and another individual cord 71 can be wound for the right portion of said radially outermost ply 7. Also, for instance, two individual cords 71 can be wound starting in the left shoulder region and ending in the right shoulder region, both being individually guided during the laying down process.

The tread compound 11 and the decoupling compound of the decoupling layer 13 are very different in nature, so that the interface 9 between the two compounds appears very clearly as shown on the drawing. In passenger car tires, typically, the decoupling compound is a rubber mix whose base elastomer is natural rubber, or at least contains principally natural rubber as base elastomer.

The ply 7 of cords oriented substantially circumferentially is comprised of textile cords which are spirally wound in order to ensure good stiffening hoop effect of the crown 2. In the exemplary embodiment illustrated in FIG. 1, these cords are dipped cords which have a linear density of 521 tex. They are made from two identical aramid yarns of 167 tex individually twisted at 280 t/m (turns per meter) in a first direction and from one Nylon yarn of 140 tex twisted at 280 t/m in the same direction, these three yarns being further simultaneously twisted at 280 t/m in the opposite direction. The initial modulus of elasticity of this cord is 740 cN/tex, and the stress developed at a 3% elongation is 30 cN/tex. The diameter of the cord is 0.8 mm.

The diameter Φ of a textile cord is determined as follows: with the cord under tension, a parallel light beam is interrupted by the cord, creating a shadow which is measured instantaneously by an array of photoreceptors. A measurement sequence at 900 points along 50 cm of the cord yields the value of the mean width of the cord. The diameter Φ is calculated by averaging 4 such measurement sequences.

Figure 5:
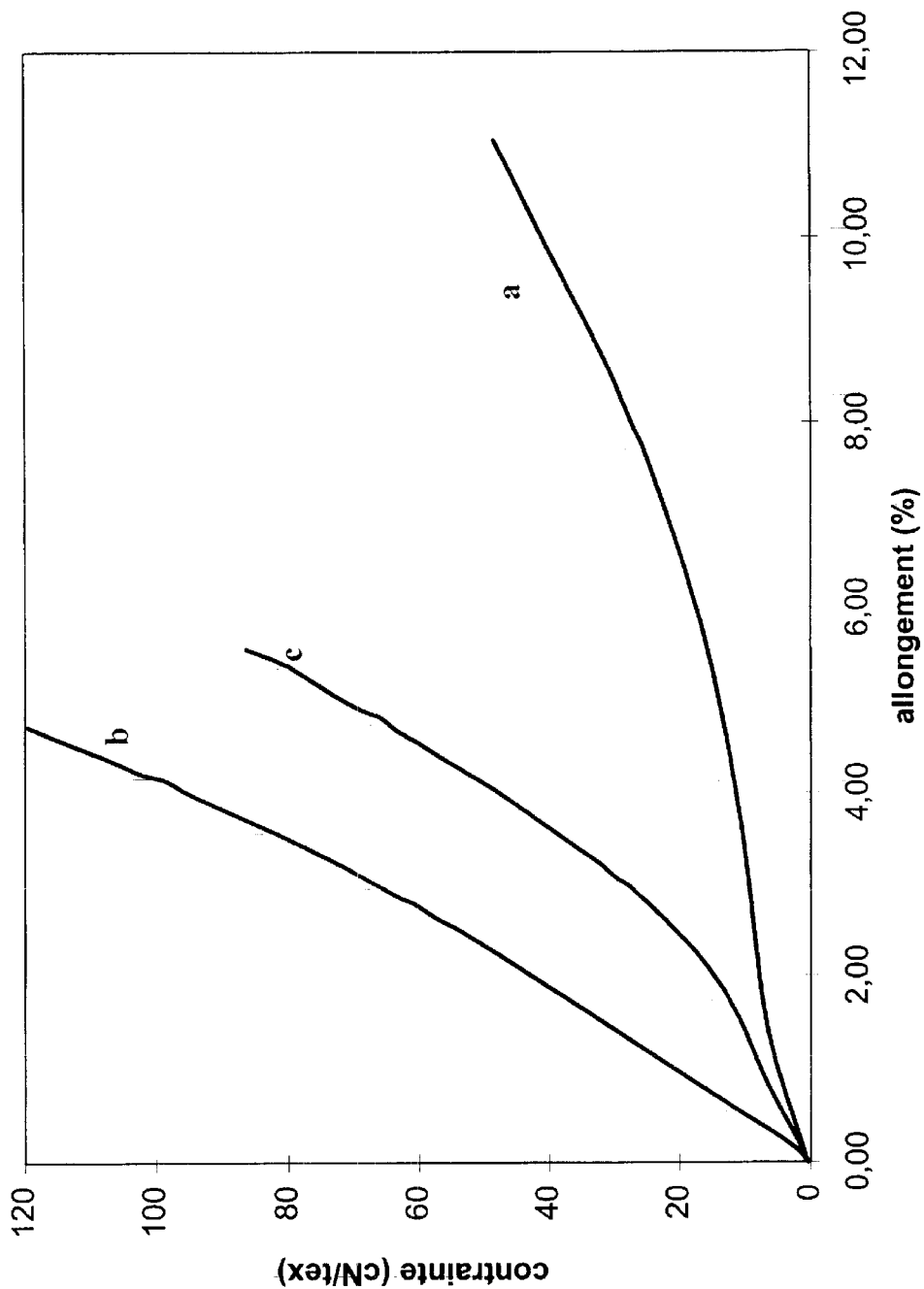
FIG. 5 is a plot of stress versus elongation for three types of cords described hereinbelow.
Figure 6:
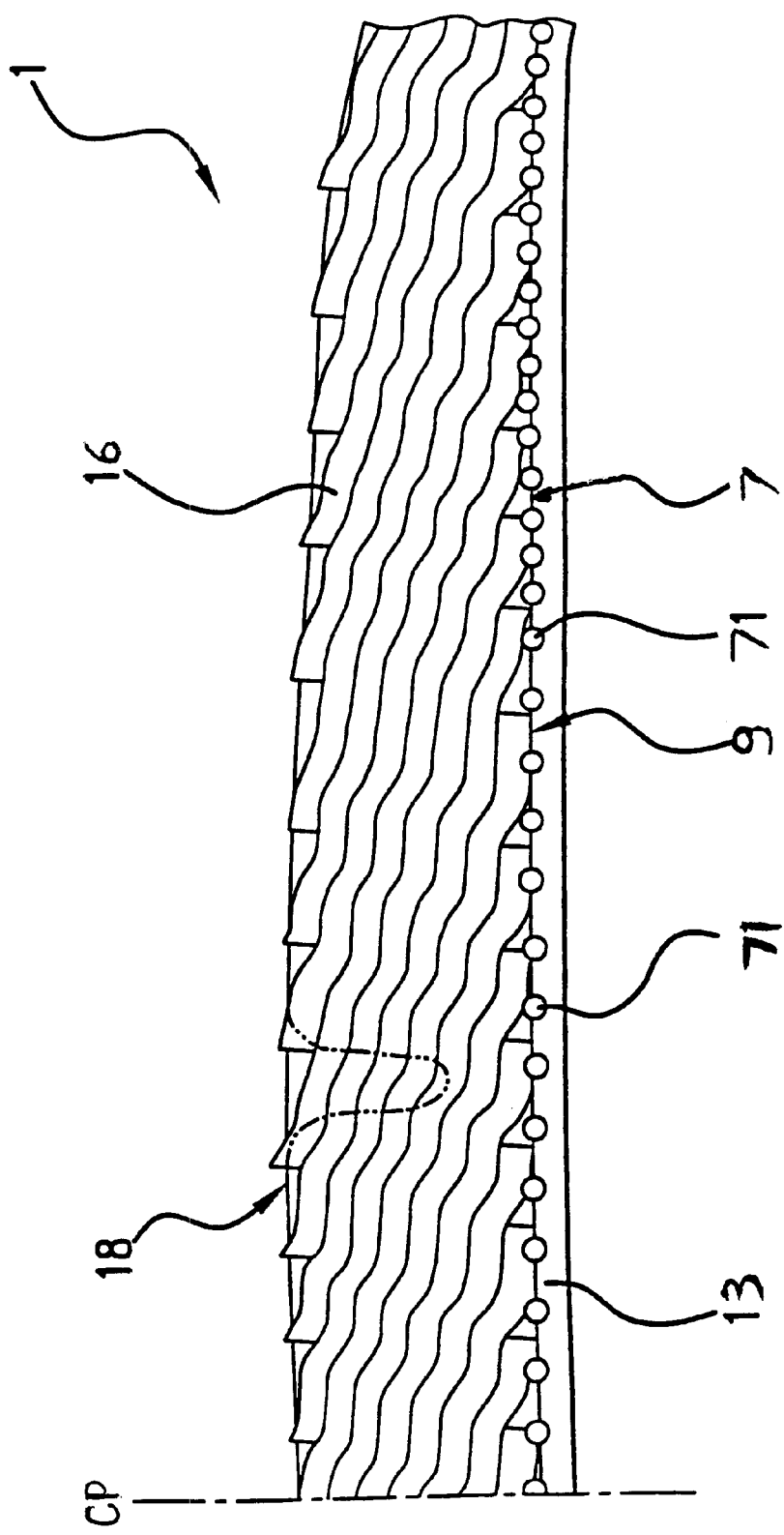
FIG. 6 is a partial transverse cross section of a tire before molding, according to the invention.

FIG. 5 shows a curve of stress versus elongation for this cord (curve c) as well as for two other commonly used cords:
curve a: Nylon cord (2 yarns of Nylon);
curve b: aramid cord (2 aramid yarns);
curve c: aramid-Nylon cord.

The Nylon cord (curve a) is a dipped cord of 441 tex made from two identical Nylon yarns of 210 tex individually twisted at 200 t/m in a first direction then simultaneously twisted at 200 t/m in the opposite direction. The initial modulus of elasticity of this cord is 530 cN/tex, the stress at a 3% elongation is 9 cN/tex. Thus, the modulus of elasticity of this cord is low at low deformations as well as at appreciable deformations.

The aramid cord (curve b) is a dipped cord of 376 tex made from two identical aramid yarns of 167 tex individually twisted at 440 t/m in a first direction then simultaneously twisted at 440 t/m in the opposite direction. The initial modulus of elasticity of this cord is 2030 cN/tex, the stress at a 3% deformation is 68 cN/tex. This cord is thus characterized by a high modulus of elasticity.

In the embodiment of the tire 1 according to FIG. 1, the tread compound 2 is in direct contact with the outer tire ply 7. This configuration facilitates the fabrication of the tire by reducing the number of different components to be installed and the time needed for this fabrication.

The high modulus of elasticity of the cords of the tire ply 7 allows said cords to be disposed externally of tire plies 5 and 6 at a high winding pitch, namely greater than 2 mm, and thereby with a fill coefficient (FC) less than 0.4. If cords comprised solely of Nylon were used, this would require a relatively high laying density, whereby the fill coefficient FC would be relatively high, with an inter-cord space very small and therefore would result in weaker binding of the tread compound over the cords of the tire ply 7.

One may employ hybrid Nylon-aramid cords such as illustrated in FIG. 5c. Compared to aramid cords, these hybrid cords have a lower modulus of elasticity at low deformations, which makes it possible to reduce the tire coast-by noise. This choice also results in a more comfortable ride.

Figure 2:
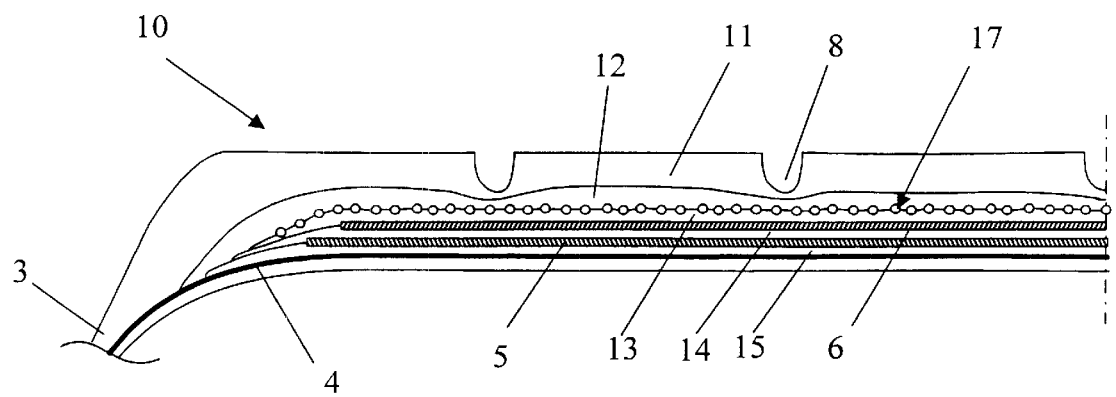
FIG. 2 is a partial transverse cross section of a second embodiment of an inventive tire.

FIG. 2 is a partial transverse cross section of a pneumatic tire 10 according to the invention, the crown of which tire has an underlayer 12 between the tread region 11 and the outer ply 17. The ply 17 as shown is comprised of cords which are substantially circumferentially oriented. The underlayer 12 is applied directly onto the cords of the ply 17.

Figure 3:
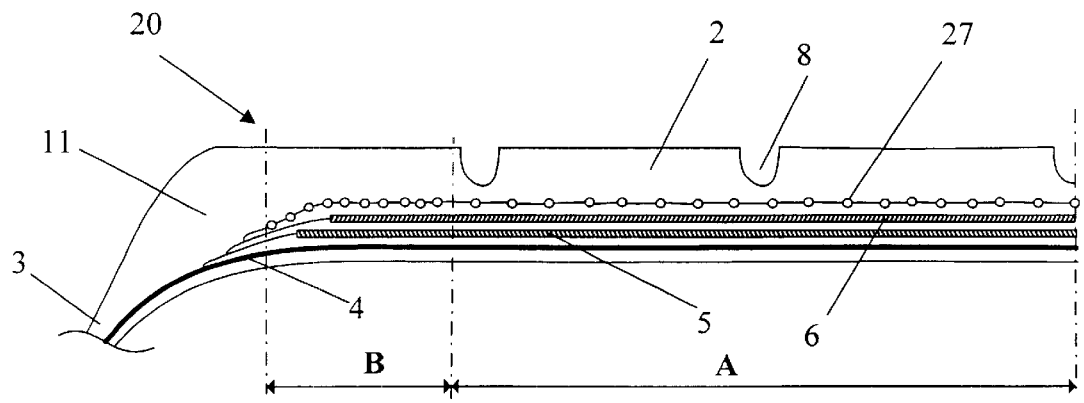
FIG. 3 is a partial transverse cross section of a variant embodiment of the tire according to FIG. 1.

FIG. 3 illustrates a variant embodiment 20 of the tire according to FIG. 1. In this variant tire 20 the outer ply 27 of substantially circumferentially oriented cords are applied:
at a first winding pitch $P_1$ in the axial zone A disposed generally in the center of the crown; and
at a second winding pitch $P_2$ in the axial zone B located laterally of zone A.

Both $P_1$ and $P_2$ are chosen such that the fill coefficient FC of the ply 27 is <0.4, and such that $P_1 > P_2$. The magnitude of $p_1$ may be in the range 5–10 mm, and that of $p_2$ in the range 2–4 mm.

This change in the winding pitch allows increased cord density of the circumferentially oriented cords in the lateral regions if the crown, to provide increased strength at high rotational speeds. The u se of cords having a high modulus of elasticity at higher deformations (curves b and c in FIG. 5) enables higher winding pitches. The proportion of the width of the crown occupied by zone B may vary in different tire designs.

Figure 4:
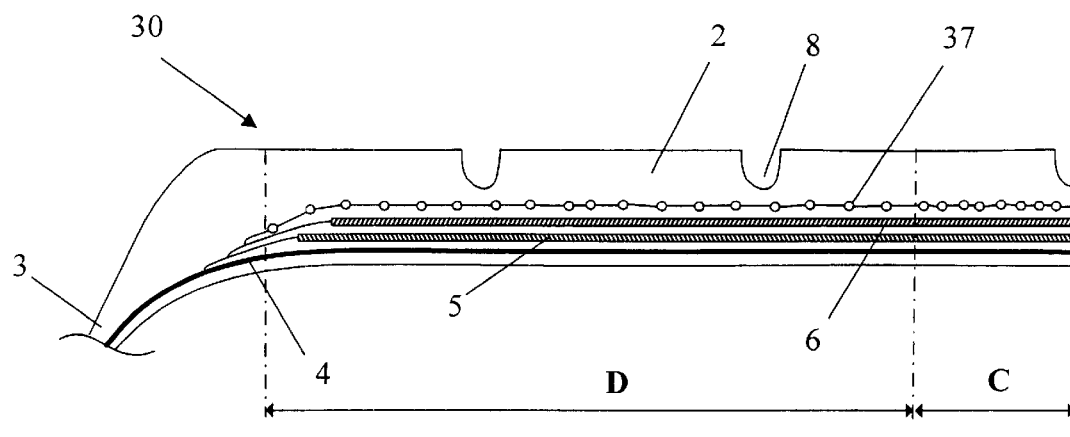
FIG. 4 is a partial transverse cross section of a second variant embodiment of the tire according to FIG. 1.

FIG. 4 illustrates another variant embodiment of the tire according to FIG. 1. In this variant tire 30, the outer ply 37 of substantially oriented cords has a first winding pitch $P_1$ in the axial zone C at the center of the crown, and a second winding pitch $p_2$ in the axial zone D located laterally of zone C. Both $P_1$ and $P_2$ are chosen such that the fill coefficient FC of the ply 37 in <0.4, and such that $p_1 < P_2$. The magnitude of $p_1$ may be in the range of 2–4 mm, and that of $P_2$ in the range 4–8 mm.

This change in the winding pitch allows increased cord density of the circumferentially oriented cords in the central zone of the crown, to provide a <<flatter>> transverse profile of the tire, thereby improving tire performance in vehicle handling. As with the preceding embodiment of FIG. 3, the width of the zone C in the axial direction admits of substantial variation.

According to a first embodiment of a method of fabrication of the inventive tire, the inventive tire may be advantageously fabricated on a rigid core which imparts the form to the interior cavity of the tire, as described in patents EP 0,242,840 or EP 0,822,047. All the components of the tire are applied over said core, as required by the final architecture. The components are thus applied directly in their final dispositions, without subjecting them to externally applied forming stress at any time during the fabrication. Then the vulcanization process takes place. The core is removed when the vulcanizing process is complete. To lay the reinforcing cords in the carcass, one may particularly employ the apparatuses described in EP 0,243,851. To lay the cords in the crown, one may particularly employ the apparatuses described in EP 0,248,301, and to apply the rubber materials one may particularly employ the apparatuses described in EP 0,264,600.

The above-described method of fabrication has the advantage of greatly reducing or eliminating pre-stressing of the cords, particularly those oriented at 0° (with respect to the circumferential direction around the main axis of the tire), during the traditional forming operations.

One may also partially cool the tire while on the core, so as to maintain the cords in the state of deformation imposed during their laying.

It is also possible to fabricate the tire or a drum of the type described in WO 97/47,463, or EP 0,718,090, wherewith one accomplishes the rough-shaping of the tire before laying the substantially circumferentially oriented cords.

One may then lay said circumferentially oriented cords on an underlying form means which has a geometry identical to that intended in the vulcanizing mold. The crown is then assembled using a rough-formed piece which is complementary to the tire, employing transfer techniques known to a person skilled in the art. Then, again according to methods which are per se known, the tire is loaded into a press and the tire is subjected to pressure via a membrane disposed in the inferior of the tire.

This fabrication method also serves to minimize or eliminate pre-stressing which can result from the forming processes which take place in the vulcanization press.

All of the described methods enable the substantially circumferentially oriented cords to be spirally, wherewith the diameters of the laid cords differ by less than 0.5% from the final diameters of said cords in the tire after vulcanization. This low deviation between the pre- and post-vulcanization diameter can be achieved over the entire width of the crown 2.

What is claimed is:

1. A tire, comprising a crown extended by two respective sidewalls and two respective beads, and a carcass which is anchored in said beads, said crown having the following components, disposed in the following order with progression radially from the interior to the exterior with respect to the main axis of the tire:

at least one reinforcing ply comprising parallel cords disposed at an angle α in the range 10–75° with respect to the circumferential direction;

at least one radially outermost ply having an axial width comprised of cords which are spirally wound wherewith the cords themselves are substantially oriented in the circumferential direction, said circumferentially oriented cords having a radially outward side of the cords and a radially inner side of the cords, and a tread compound;

wherein, in a substantial portion of the axial width of said at least one radially outermost ply, in any cross section perpendicular to the axis of the tire and intersecting a cord of said at least one radially outermost ply:

said tread compound has direct contact with the radially outward side of the cords of said at least one radially outermost ply, there is a first decoupling layer comprising a decoupling compound different than the tread compound, said decoupling compound having direct contact with the radially inner side of the cords of said at least one radially outermost ply, the tread compound having contact with the decoupling compound in interfaces terminating axially on the cords of said at least one radially outermost ply; and the at least one radially outermost ply has a fill coefficient FC <0.4, said fill coefficient being defined as $$FC = \Phi/p,$$

where $\Phi$ is the cord diameter of said cords and p is the winding pitch between the cord axes of neighboring said cords comprising the spiral winding.

2. A tire according to claim 1, wherein the fill coefficient FC of the at least one radially outermost ply is inferior or equal to 0.4, over the entire axial width of said ply.

3. A tire according to claim 1, wherein the fill coefficient FC of the at least one radially outermost ply has a lower value in the central zone of the crown than in the lateral zones.

4. A tire according to claim 1, wherein the fill coefficient FC of the at least one radially outermost ply has a higher value in the central zone of the crown than in the lateral zones.

5. A tire according to claim 1, wherein, said tread compound comprises:

a first tread compound intended to come into contact with the road, and an underlayer compound different from the first tread compound disposed radially inwardly of said first tread compound, wherewith said underlayer compound is in direct contact with said substantially circumferentially oriented cords of the at least one radially outermost ply.

6. A tire according to claim 1, wherein said tread compound is laid down in strips wound on said at least one radially outermost ply.

7. A tire according to claim 1, wherein said at least one radially outermost ply is laid down by winding a single cord individually guided along a desired path.

8. A tire according to claim 1, wherein the substantially circumferentially oriented cords develop a stress at 3% deformation greater than 12 cN/tex.

9. A tire according to claim 8, wherein the substantially circumferentially oriented cords develop a stress at 3% deformation greater than 20 cN/tex.

10. A tire according to claim 8, wherein the substantially circumferentially oriented cords have an initial modulus of elasticity less than 900 cN/tex.

11. A tire according to claim 9, wherein the substantially circumferentially oriented cords have an initial modulus of elasticity less than 800 cN/tex.

12. A tire according to claim 1, wherein the substantially circumferentially oriented cords comprise at least one Nylon yarn associated with at least one aramid yarn.

* * * * *